Nov. 17, 1964 G. C. MAY 3,157,027
PROPULSION NOZZLES
Filed Feb. 1, 1963

INVENTOR
GORDON CYRIL MAY
BY
ATTORNEYS

United States Patent Office 3,157,027
Patented Nov. 17, 1964

3,157,027
PROPULSION NOZZLES
Gordon Cyril May, Allestree Park, Derby, England, assignor to Rolls-Royce Limited, Derby, England, a company of Great Britain
Filed Feb. 1, 1963, Ser. No. 255,462
Claims priority, application Great Britain, Feb. 12, 1962, 5,379/62
4 Claims. (Cl. 60—35.6)

This invention concerns jet engines which are provided with convergent-divergent nozzles.

According to the present invention, there is provided a jet engine having a convergent-divergent nozzle which comprises an assembly of nozzle members which may be moved to vary the size of the throat of the nozzle, such movement of the nozzle members involving radial movement of their downstream ends, an assembly of radially movable casing members within which the nozzle members are mounted, linkage means connecting together the assemblies of nozzle members and casing members so that said assemblies move in unison, a frusto-conical member which tapers axially in a downstream direction, power means for effecting axial movement of the frusto-conical member, and rollers on said nozzle members, which rollers engage said frusto-conical member.

Such an arrangement enables any gap between the downstream ends of the nozzle members and casing members to be reduced. This is desirable since the gap will otherwise constitute a dead zone which will give rise to turbulence and base drag.

Preferably the said nozzle is provided with first and second sets of nozzle members which respectively form the convergent and divergent parts of the nozzle, the first set of nozzle members being provided with the said rollers engaging the frusto-conical member, and the nozzle members of the said second set being mounted at the downstream end of the frusto-conical member.

Preferably the nozzle members of the said second set are pivotally mounted at the downstream end of the frusto-conical member and are connected by pin and slot connections to the casing members, the casing member being pivotally connected to the frusto-conical member.

The downstream ends of the nozzle members of the said second set are preferably in sliding contact with the downstream ends of the casing members or with means carried thereby. Thus the nozzle members of the second set may slide in contact with sliding blocks which are carried within and at the downstream ends of the casing members.

Figure 1:
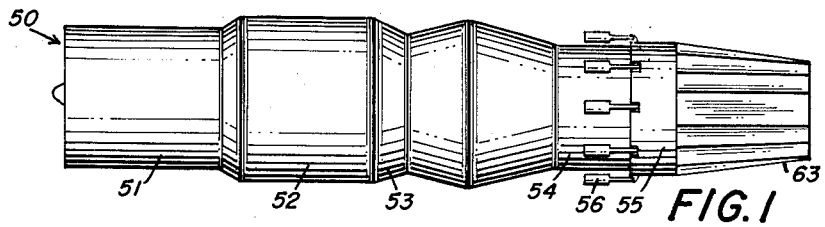
Figure 4:
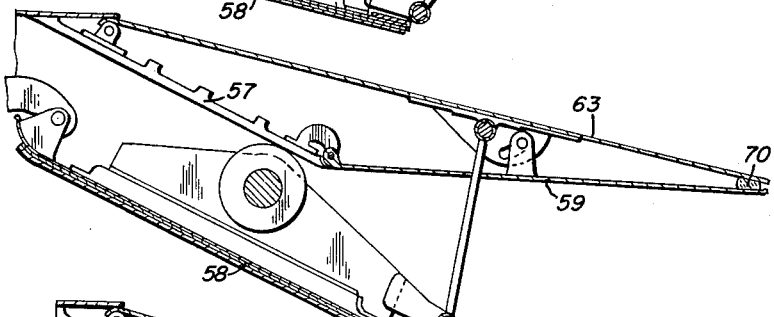
Figure 5:
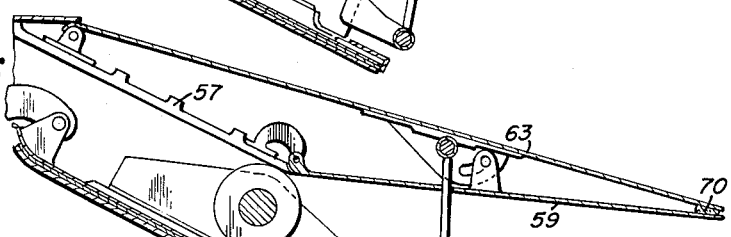
Figure 6:

The invention is illustrated, merely by way of example, in the accompanying drawings, in which:

FIGURE 1 is an elevation of a gas turbine engine according to the present invention, FIGURES 2-5 are broken away sections showing some of the structure of FIGURE 1 on a larger scale and in a number of different positions of the parts thereof, and FIGURE 6 is a broken away section on yet a larger scale, of part of the structure shown in FIGURES 2-5.

Referring to the drawings, a gas turbine forward propulsion engine 50 adapted for use on a supersonic aircraft comprises in flow series a compressor 51, combustion equipment 52, and a turbine 53, the turbine exhaust gases flowing through a jet pipe 54.

Mounted about the downstream end of the jet pipe 54 is a cylindrical casing 55. Pneumatically or hydraulically operated rams 56 are provided for effecting axial movement of the casing 55 over the jet pipe 54.

A frusto-conical member 57, which tapers axially in a downstream direction, is mounted within and is connected to the casing 55.

Pivotally mounted at the downstream ends of the jet pipe 54 and the frusto-conical member 57 respectively, are sets of nozzle members 58, 59. The sets of nozzle members 58, 59 respectively form the convergent and divergent parts of a convergent-divergent nozzle.

Each of the nozzle members 58 is secured, by way of a corrugated spacer 60, to a roller support member 61. Each of the members 61 carries a roller 62 which engages the frusto-conical member 57.

Pivotally connected to the upstream ends of the frusto-conical member 57 are a plurality of radially movable casing members 63 which collectively constitute, in effect, the downstream part of the casing 55.

Each of the casing members 63 is pivotally connected to one end of a link 64 whose other end is pivotally connected to the respective roller support member 61.

Each of the casing members 63 is internally provided with a radially extending plate 65 having a slot 66 therein. A pin 67 is slidable in the slot 66, the pin 67 being mounted on a bracket 68 carried by and externally of the respective nozzle member 59.

A sliding block 70 (best seen in FIG. 6), is mounted internally of the downstream end of each of the casing members 63, each of the nozzle members 59 being slidable over the respective sliding block 70.

Figure 2:
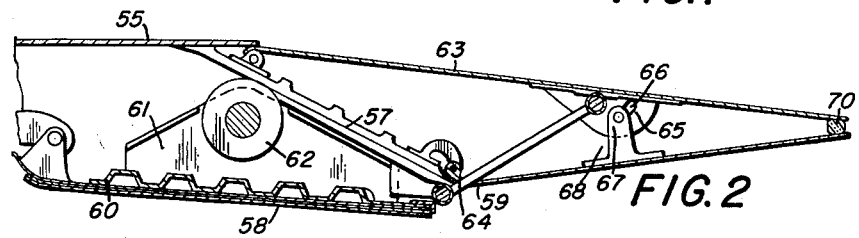

FIGURES 2 and 5 respectively illustrate the positions of the parts when the area of the throat of the convergent-divergent nozzle is at its maximum and minimum values.

Figure 3:
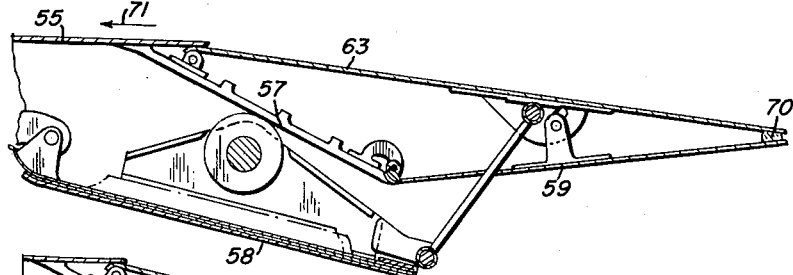

In operation, if the parts are in the FIG. 2 position, in which the rollers 62 are disposed towards the upstream end of the frusto-conical member 57, and it is desired to reduce the area of the throat of the nozzle, the rams 56 are actuated to move the casing 55, and hence the frusto-conical member 57, axially in an upstream direction, as indicated by the arrow 71 in FIG. 3.

This causes the nozzle members 58 to be forced radially inwards against the pressure of the jet gases and to effect a radially inward pull on the casing members 63 by way of the links 64. The radially inward movement of the casing members 63 is transmitted, via the pin and slot connection 66, 67, to cause radial inward movement of the nozzle members 59, the latter movement being accompanied by some sliding movement of the nozzle members 59 over the sliding blocks 70.

As the frusto-conical member 57 moves axially upstream, the parts are gradually moved through the FIGURE 3 and FIGURE 4 positions to the FIGURE 5, or minimum area, position in which the rollers 62 are disposed at the downstream end of the frusto-conical member 57.

The parts are, of course, movable from the FIGURE 5, through the FIGURE 4 and FIGURE 3 to the FIGURE 2 position on movement of the frusto-conical member 57 in a downstream direction. Such downstream movement of the frusto-conical member 57 permits the nozzle members 58 to be forced radially outwardly by the jet gases, radially outward movement of the nozzle members 58 being accompanied by like movement of the nozzle members 59 and the casing members 63.

It will be noted that, in all positions of the parts, there is substantially no gap between the downstream ends of the casing members 63 and nozzle members 59. A substantial gap does exist between the downstream ends of the casing members 63 and the nozzle members 58 but this gap is appreciably smaller than it would be if the casing members 63 did not move radially inwardly and outwardly in unison with the like movement of the nozzle members 58.

Thus the construction shown in the drawings reduces base drag.

I claim:

1. A jet engine having a convergent-divergent nozzle which comprises an assembly of first and second sets of nozzle members which may be moved to vary the size of the throat of the nozzle, such movement of the nozzle members involving radial movement of their downstream ends, said first and second sets of nozzle members respectively forming the convergent and divergent parts of the nozzle, an assembly of radially movable casing members within which the nozzle members are mounted, linkage means connecting together the assemblies of nozzle members and casing members so that said assemblies move in unison, a frusto-conical member which tapers axially in a downstream direction, the said second set of nozzle members being mounted at the downstream end of the frusto-conical member, power means for effecting axial movement of the frusto-conical member, and rollers on said first set of nozzle members, which rollers engage said frusto-conical member.

2. A jet engine having a convergent-divergent nozzle which comprises an assembly of first and second sets of nozzle members which may be moved to vary the size of the throat of the nozzle, such movement of the nozzle members involving radial movement of their downstream ends, said first and second sets of nozzle members respectively forming the convergent and divergent parts of the nozzle, an assembly of radially movable casing members within which the nozzle members are mounted, linkage means connecting together the assemblies of nozzle members and casing members so that said assemblies move in unison, a frusto-conical member which tapers axially in a downstream direction, the said second set of nozzle members being pivotally mounted at the downstream end of the frusto-conical member, pin and slot connections between the said second set of nozzle members and the casing members, the casing members being pivotally connected to the frusto-conical member, power means for effecting axial movement of the frusto-conical member, and rollers on said first set of nozzle members, which rollers engage said frusto-conical member.

3. A jet engine having a convergent-divergent nozzle which comprises an assembly of first and second sets of nozzle members which may be moved to vary the size of the throat of the nozzle, such movement of the nozzle members involving radial movement of their downstream ends, said first and second sets of nozzle members respectively forming the convergent and divergent parts of the nozzle, an assembly of radially movable casing members within which the nozzle members are mounted, linkage means connecting together the assemblies of nozzle members and casing members so that said assemblies move in unison, a frusto-conical member which tapers axially in a downstream direction, the said second set of nozzle members being pivotally mounted at the downstream end of the frusto-conical member, pin and slot connections between the said second set of nozzle members and the casing members, the casing members being pivotally connected to the frusto-conical member, power means for effecting axial movement of the frusto-conical member, and rollers on said first set of nozzle members, which rollers engage said frusto-conical member, the downstream ends of the nozzle members of the said second set being in sliding contact with the downstream ends of the casing members.

4. A jet engine having a convergent-divergent nozzle which comprises an assembly of first and second sets of nozzle members which may be moved to vary the size of the throat of the nozzle, such movement of the nozzle members involving radial movement of their downstream ends, said first and second sets of nozzle members respectively forming the convergent and divergent parts of the nozzle, an assembly of radially movable casing members within which the nozzle members are mounted, linkage means connecting together the assemblies of nozzle members and casing members so that said assemblies move in unison, a frusto-conical member which tapers axially in a downstream direction, the said second set of nozzle members being pivotally mounted at the downstream end of the frusto-conical member, pin and slot connections between the said second set of nozzle members and the casing members, the casing members being pivotally connected to the frusto-conical member, power means for effecting axial movement of the frusto-conical member, rollers on said nozzle members, which rollers engage said frusto-conical member, and sliding blocks mounted within and at the downstream ends of the casing members, the nozzle members of the said second set sliding in contact with the said sliding blocks.

References Cited by the Examiner

UNITED STATES PATENTS

| | | | |
|---|---|---|---|
| 3,004,385 | 10/61 | Spears et al. | 60—35.6 |
| 3,025,666 | 3/62 | Keen | 60—35.6 |
| 3,028,730 | 4/62 | Clark | 60—35.6 |

SAMUEL LEVINE, *Primary Examiner.*